June 7, 1949.  L. A. DAILEY  2,472,572
LANDING NET
Filed June 4, 1945
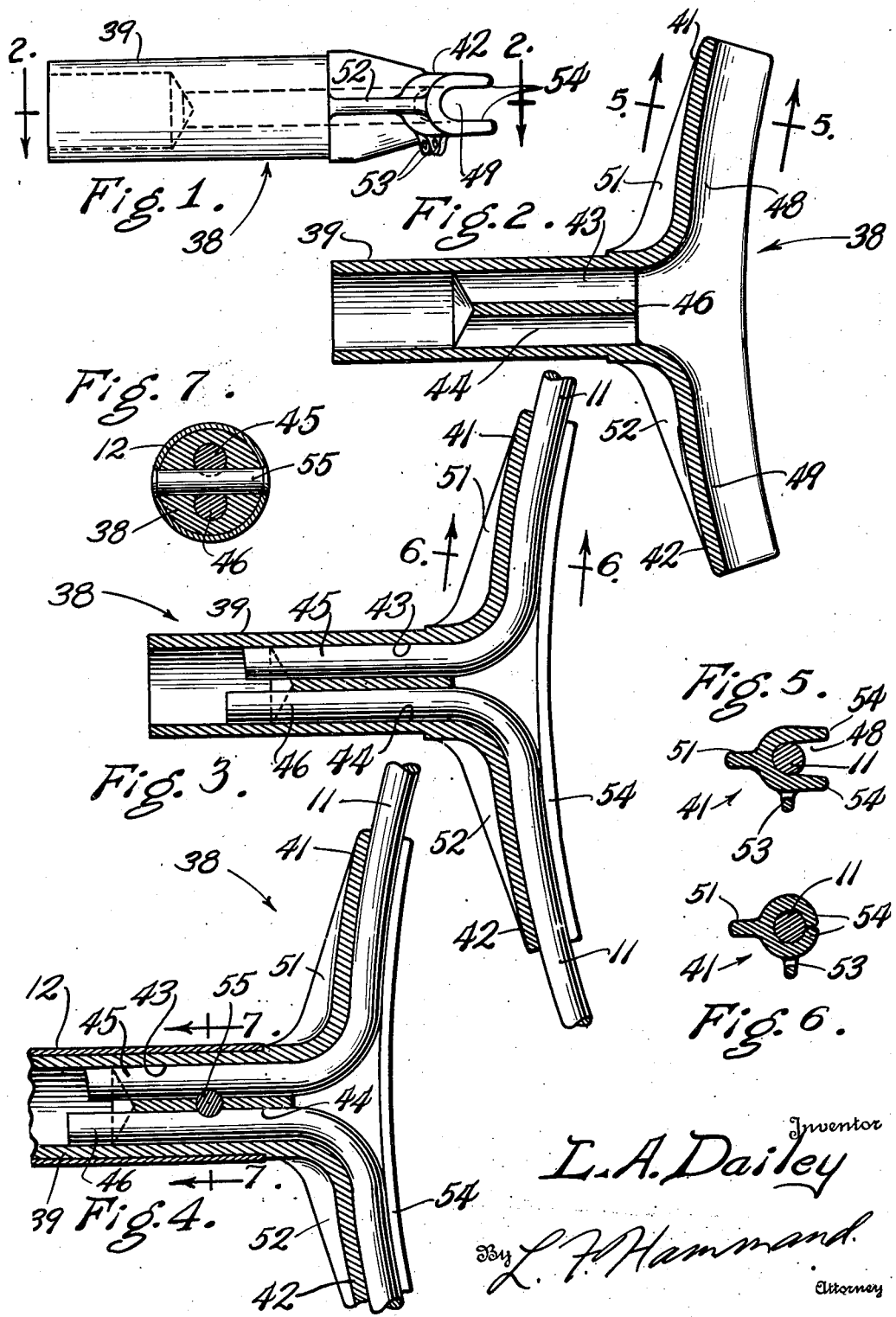
Inventor
L. A. Dailey
By L. F. Hammand
Attorney Patented June 7, 1949

2,472,572

UNITED STATES PATENT OFFICE 2,472,572

LANDING NET

Lewis Anthony Dailey, Oshkosh, Wis.

Application June 4, 1945, Serial No. 597,431

1 Claim. (Cl. 306—45)

The present invention relates to landing nets, and more particularly to an improved net having an all metal frame, characterized by certain novel features of structure that combine relatively great mechanical strength, good balance, and unusually light weight.

It is the general aim of the invention to provide a landing net that is at once stronger, more easily handled, and more efficient than types now in use.

The specific object of the invention resides in the provision of an improved handle bracket fitting joining the net handle to the net supporting loop, wherein the handle and loop are rigidly joined and positively locked together.

Other objects will appear in connection with the description of the form of the invention chosen as best illustrative of the invention and illustrated in the drawings in which:

Fig. 1 is an elevational view of the handle bracket fitting.

Fig. 2 is a sectional view of the handle bracket fitting, taken on the plane of the line 5—5 of Figure 1.

Fig. 3 is a sectional view, similar to Fig. 2, showing the net supporting loop assembled with the handle bracket fitting.

Fig. 4 is a sectional view, similar to Fig. 3, showing the handle, handle bracket fitting and net supporting loop in completely assembled relationship.

Fig. 5 is a detail sectional view taken on the plane of the line 8—8 of Figure 2 with the net loop shown in position.

Fig. 6 is a detail sectional view taken on the plane of the line 9—9 of Figure 3, and Fig. 7 is a detail sectional view taken on the plane of the line 10—10 of Figure 4.

The net includes, in general, a relatively large net loop 11 adapted to support a fabric net. The net loop 11 is supported on a handle consisting of a thin walled aluminum tube 12.

The net loop 11 is mounted on the tube 12 by means of the handle bracket fitting 38. This fitting includes a cylindrical mounting portion 39 and a pair of loop supporting arms 41 and 42. The mounting portion 39 is formed with a cylindrical exterior surface of such diameter as to fit within the end of the tube 12. The extreme end of the mounting portion is tubular, but the major portion includes a pair of parallel bores 43 and 44 slightly spaced apart from each other. The bores are dimensioned to fit closely over the free ends 45 and 46 of the wire net loop 11. The bores 43 and 44 terminate at the forward end 46 of the mounting portion, where they are tangent with the wire supporting channels 48 and 49, which are formed in the loop supporting arms 41 and 42 respectively. Each of the channels 48 and 49 describe a compound curve consisting of a concave portion on the radius of the net loop and a convex portion of much smaller radius extending from the loop radius to the points of tangency with the parallel bores 43 and 44.

The loop supporting arms 41 and 42 are reinforced by the webs 51 and 52, and, if desired, these arms may also include a number of loops 53 on which individual cords of the net may be fastened. The arms 41 and 42 also include deformable flanges 54 extending along the opposite edges of the channels 48 and 49.

The net loop 11, fitting 38 and handle tube 12 are locked together by assembling them as indicated in the drawings, deforming the flanges 54 as shown in Figure 6 to firmly secure portions of the wire loop 11 in the channels 48 and 49, drilling through the handle tube 12, fitting 38 and into both of the ends of the wire loop 11, and riveting.

It is to be noted that the single rivet 55 serves not only to secure the fitting 38 to the handle, but also serves to positively lock both of the free ends of the net loop to the handle and to the fitting.

From the foregoing, it is believed apparent to those skilled in the art that the teachings of the present disclosure make possible the manufacture of landing nets having important practical advantages over types heretofore available.

In this connection it may be noted that a net of the dimension shown (formed of aluminum parts and aluminum tubing of .035 inch wall thickness) is buoyant in water and therefore not subject to loss if accidentally dropped overboard.

More important, however, is the fact that a landing net constructed as shown is well balanced, efficient in use, and of unusual mechanical strength.

The head fitting and method of assembly provide an improved net loop mounting in which each end of the loop wire is firmly secured to the fitting in a manner to prevent play, wobble or looseness of any kind.

Moreover, the net loop, fitting and handle are all positively locked to each other by a single rivet. This not only provides a desirable structure, but facilitates efficient manufacture and assembly.

The exact form of the invention shown in the drawings is a present preferred structure and is fully illustrative of the inventive concept. It is subject to some modifications and variations, however, without departing from the scope of the invention as defined by the following claim.

Having thus described the invention, what I claim as new and desire to secure by Letters Patent is:

In a device of the class described, the combination of a length of wire formed in a generally circular loop with the opposite ends of the wire extending outwardly in the plane of the loop and parallel with each other to provide a pair of mounting shanks for the loop; each of said shanks including a notch on the exterior surface thereof: a tubular handle for the loop, and a mounting fitting having a portion telescoped within the handle and including a pair of parallel bores to receive the mounting shanks of the loop, together with a single rivet extending through the handle and the mounting fitting and engaging the notches in the shanks of the loop to lock the handle fitting and loop to each other; together with a pair of loop supporting arms on the mounting fitting, said arms each having an arcuate channel extending outwardly along a portion of the loop in a direction generally perpendicular to the axis of the mounting shanks, with flanges on each of said arms surrounding and engaging the wire near the shanks to support the loop at the shanks and in the curved portions of the loop adjacent the shanks.

LEWIS ANTHONY DAILEY.

REFERENCES CITED

The following references are of record in the file of this patent:

UNITED STATES PATENTS

| Number | Name | Date |
|---|---|---|
| 52,186 | Montgomery | Jan. 23, 1866 |
| 64,381 | Terry | Apr. 30, 1867 |
| 108,304 | Valentine | Oct. 11, 1870 |
| 110,734 | Brinser | Jan. 3, 1871 |
| 237,056 | Sherwood | Jan. 25, 1881 |
| 273,279 | Hosea | Mar. 6, 1883 |
| 273,651 | Welles | Mar. 6, 1883 |
| 410,774 | Shrock | Sept. 10, 1889 |
| 744,756 | Haukvik | Nov. 24, 1903 |
| 803,160 | Franklin | Oct. 31, 1905 |
| 1,169,496 | Knauff | Jan. 25, 1916 |
| 1,543,568 | Howard | June 23, 1925 |
| 1,654,958 | Breton | Jan. 3, 1928 |
| 1,657,892 | Muldoon | Jan. 31, 1928 |
| 1,662,715 | Morrow | Mar. 13, 1928 |
| 2,305,188 | Nowicke | Dec. 15, 1942 |

FOREIGN PATENTS

| Number | Country | Date |
|---|---|---|
| 358,556 | Germany | Sept. 11, 1922 |
| 788,277 | France | Oct. 7, 1935 |

Certificate of Correction

June 7, 1949.

Patent No. 2,472,572.

LEWIS ANTHONY DAILEY

It is hereby certified that errors appear in the printed specification of the above numbered patent requiring correction as follows:

Column 1, line 23, for "line 5—5" read *line 2—2*; line 33 for "line 8—8" read *line 5—5*; line 36, for "line 9—9" read *line 6—6*; line 38, for "line 10—10" read *line 7—7*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*